(12) United States Patent
Lin et al.

(10) Patent No.: US 10,566,812 B2
(45) Date of Patent: Feb. 18, 2020

(54) SMART JEWELRY DEVICE AND CHARGER OF THE SAME

(71) Applicants: Inventec (Pudong) Technology Corporation, Shanghai (CN); INVENTEC CORPORATION, Taipei (TW)

(72) Inventors: Chun-Chi Lin, Taipei (TW); I-Ko Song, Taipei (TW); I-Fang Chen, Taipei (TW); Tse-Min Wang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 192 days.

(21) Appl. No.: 15/854,706

(22) Filed: Dec. 26, 2017

(65) Prior Publication Data

US 2019/0074703 A1   Mar. 7, 2019

(30) Foreign Application Priority Data

Sep. 6, 2017   (CN) .......................... 2017 1 0793768

(51) Int. Cl.
*H02J 7/00* (2006.01)
*A44C 15/00* (2006.01)

(52) U.S. Cl.
CPC .......... *H02J 7/0052* (2013.01); *H02J 7/0044* (2013.01); *A44C 15/0015* (2013.01)

(58) Field of Classification Search
None
See application file for complete search history.

(56) References Cited

U.S. PATENT DOCUMENTS

| 2017/0065039 A1* | 3/2017 | Takeuchi | ................. G06F 1/163 |
| 2018/0069413 A1* | 3/2018 | Chen | .................. H01R 13/7172 |

* cited by examiner

*Primary Examiner* — Jared Fureman
*Assistant Examiner* — Aqeel H Bukhari
(74) *Attorney, Agent, or Firm* — CKC & Partners Co., LLC

(57) ABSTRACT

The disclosure provides a smart jewelry device including a metal housing, two charging contacts, an insulating member, and a battery. The metal housing has a hollow portion, and the metal housing is axisymmetric relative to an axis. The two charging contacts are located on the axis and are respectively located at two endpoints of the metal housing. The insulating member is disposed among the metal housing and the charging contacts. The battery is disposed within the hollow portion and is electrically connected to the charging contacts.

10 Claims, 3 Drawing Sheets

SMART JEWELRY DEVICE AND CHARGER OF THE SAME

CROSS-REFERENCE TO RELATED APPLICATION

This application claims priority to Chinese Application Serial Number 201710793768.2, filed on Sep. 6, 2017, which is herein incorporated by reference.

BACKGROUND

Field of Invention

The present invention relates to a smart jewelry device and a charging device.

Description of Related Art

For meeting charging needs, smart jewelry device products are disposed with exposed metal pins as contacts. However, for jewelry products requiring high standards of appearance, the exposed metal pins result in severe appearance flaw. On the other hand, due to special outlook design requirements, the jewelry products face some challenges, such as matching with charging devices, charging stability, or user friendliness, desired to be overcome. Thus, to design a smart jewelry device that is appearing, durable, and user friendly is a common goal in the industry.

SUMMARY

The disclosure provides a smart jewelry device including a metal housing, two charging contacts, an insulating member, and a battery. The metal housing has a hollow portion, and the metal housing is axisymmetric relative to an axis. The two charging contacts are located on the axis and are located at two endpoints of the metal housing respectively. The insulating member is disposed among the metal housing and the charging contacts. The battery is disposed within the hollow portion and is electrically connected to the charging contacts.

In some embodiments, each of the charging contacts is axisymmetric relative to the axis.

In some embodiments, each of the charging contacts is circular or ring-shaped.

In some embodiments, the insulating member extends from one of the endpoints to the other of the endpoints through the hollow portion.

In some embodiments, the insulating member has an insulating space therein.

In some embodiments, the battery is disposed within the insulating space.

In some embodiments, the smart jewelry device further includes a circuit board electrically connected to the battery, in which the circuit board is electrically connected to the two charging contacts respectively.

In some embodiments, the charging contacts include a first contact and a second contact. The first contact is configured to be electrically connected to a first voltage source and the second contact is configured to be electrically connected to a second voltage source. The circuit board includes a first charging circuit, a second charging circuit, and a control circuit. The control circuit is configured to activate the first charging circuit if a voltage provided by the first voltage source is greater than a voltage provided by the second voltage source, and the control circuit is configured to activate the second charging circuit if the voltage provided by the second voltage source is greater than the voltage provided by the first voltage source.

In some embodiments, the smart jewelry device further includes a wireless transmission device electrically connected to the circuit board.

In some embodiments, the metal housing includes at least two sub-housings, each of the sub-housings has a thread portion, and the thread portions are meshed with each other.

In some embodiments, the metal housing includes at least two sub-housings, the sub-housings respectively include plural engaging holes and plural engaging hooks respectively engaged with the engaging holes.

In some embodiments, the metal housing is spherical, oval, cylindrical, or conical.

In some embodiments, the hollow portion is spherical, oval, cylindrical, or conical.

In another aspect, the disclosure provides a charger for the smart jewelry device. The charger includes a main body and two voltage sources. The main body has an accommodating portion, in which a shape of the accommodating portion is conformed to at least one part of a shape of the smart jewelry device. The two voltage sources are respectively disposed at two ends of the accommodating part to correspond to the charging contacts of the smart jewelry device.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
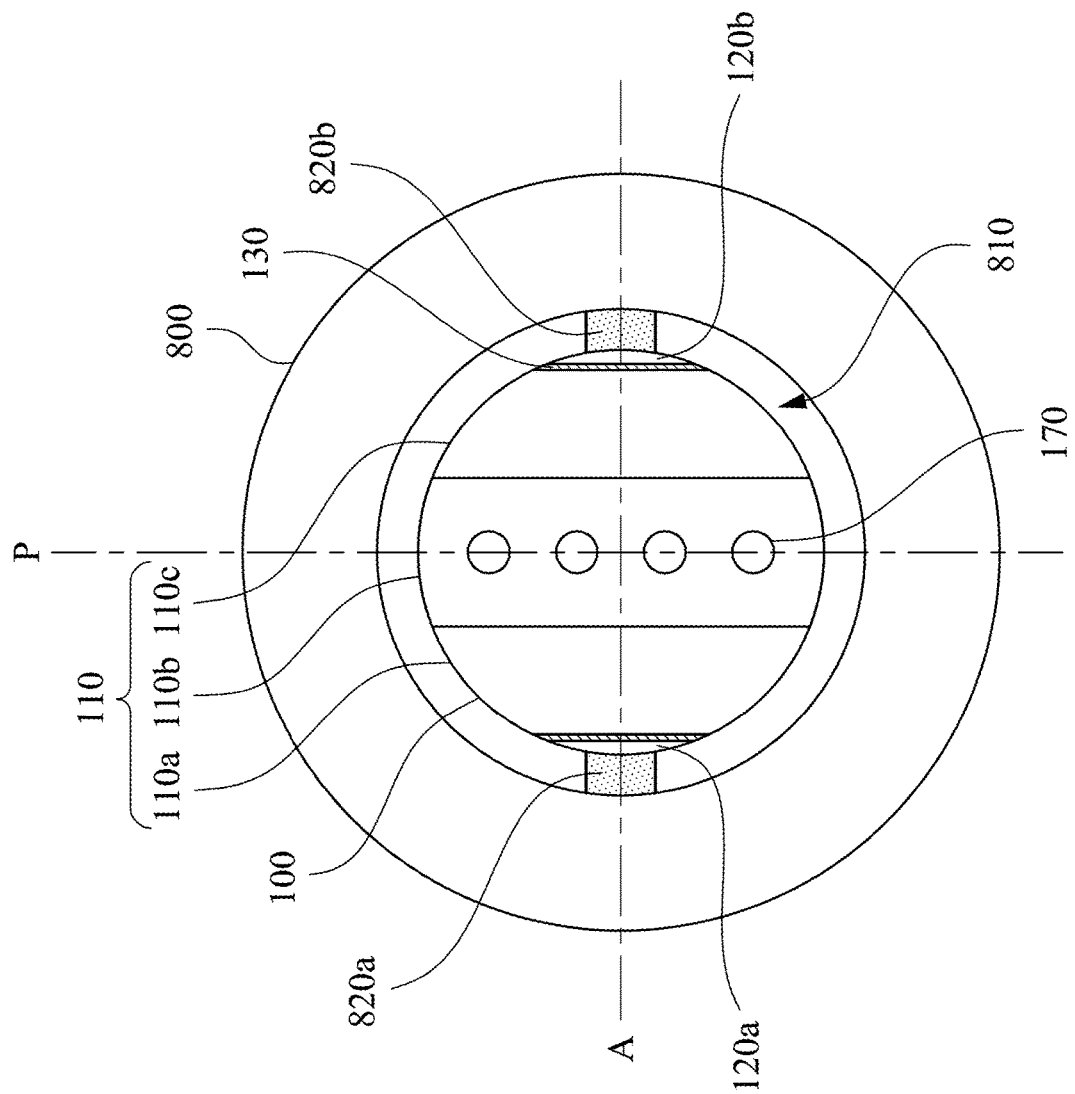
FIG. 1 illustrates a schematic top view of a smart jewelry device charged in a charger according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
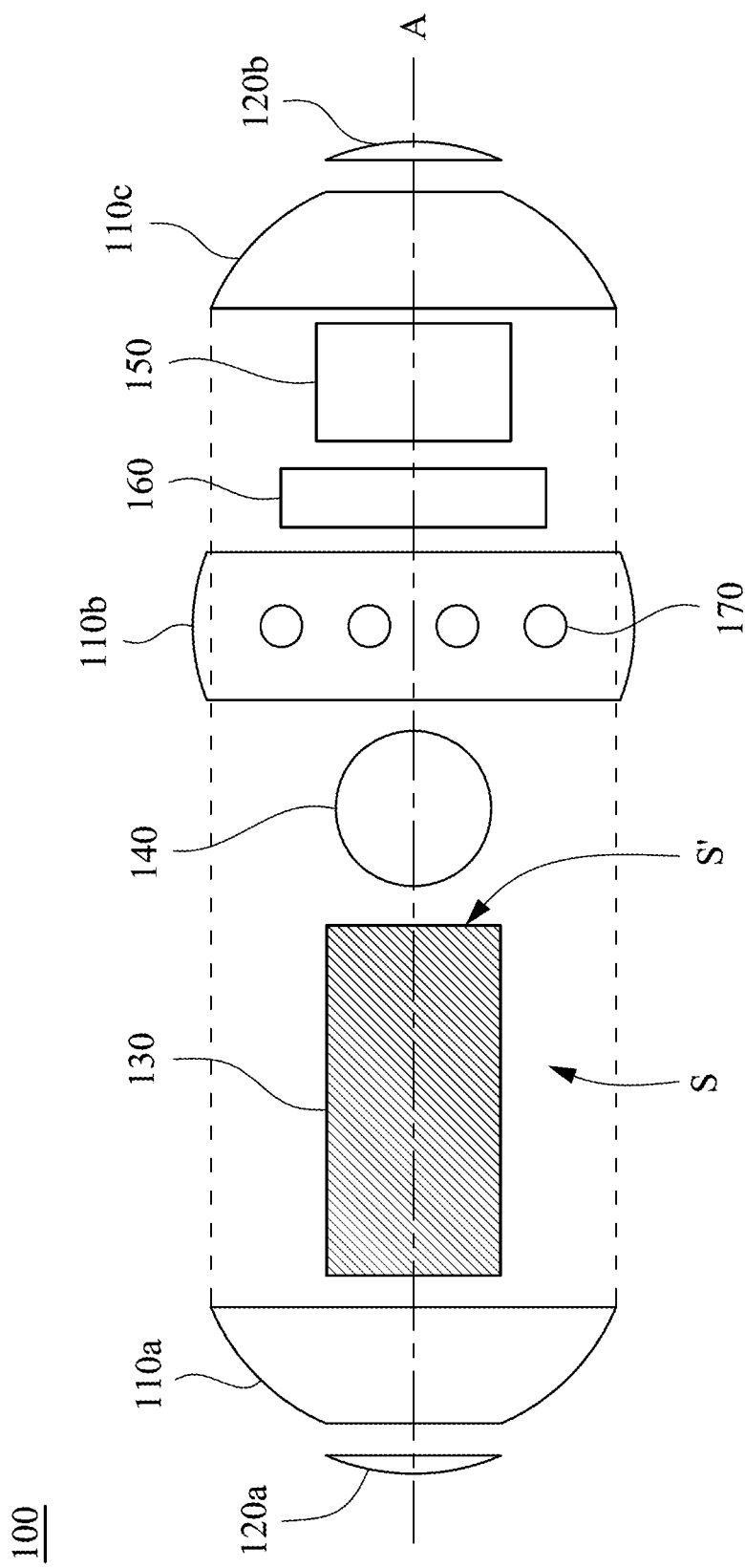
FIG. 2 illustrates a schematic exploded view of the smart jewelry device shown in FIG. 1.
Figure 3:
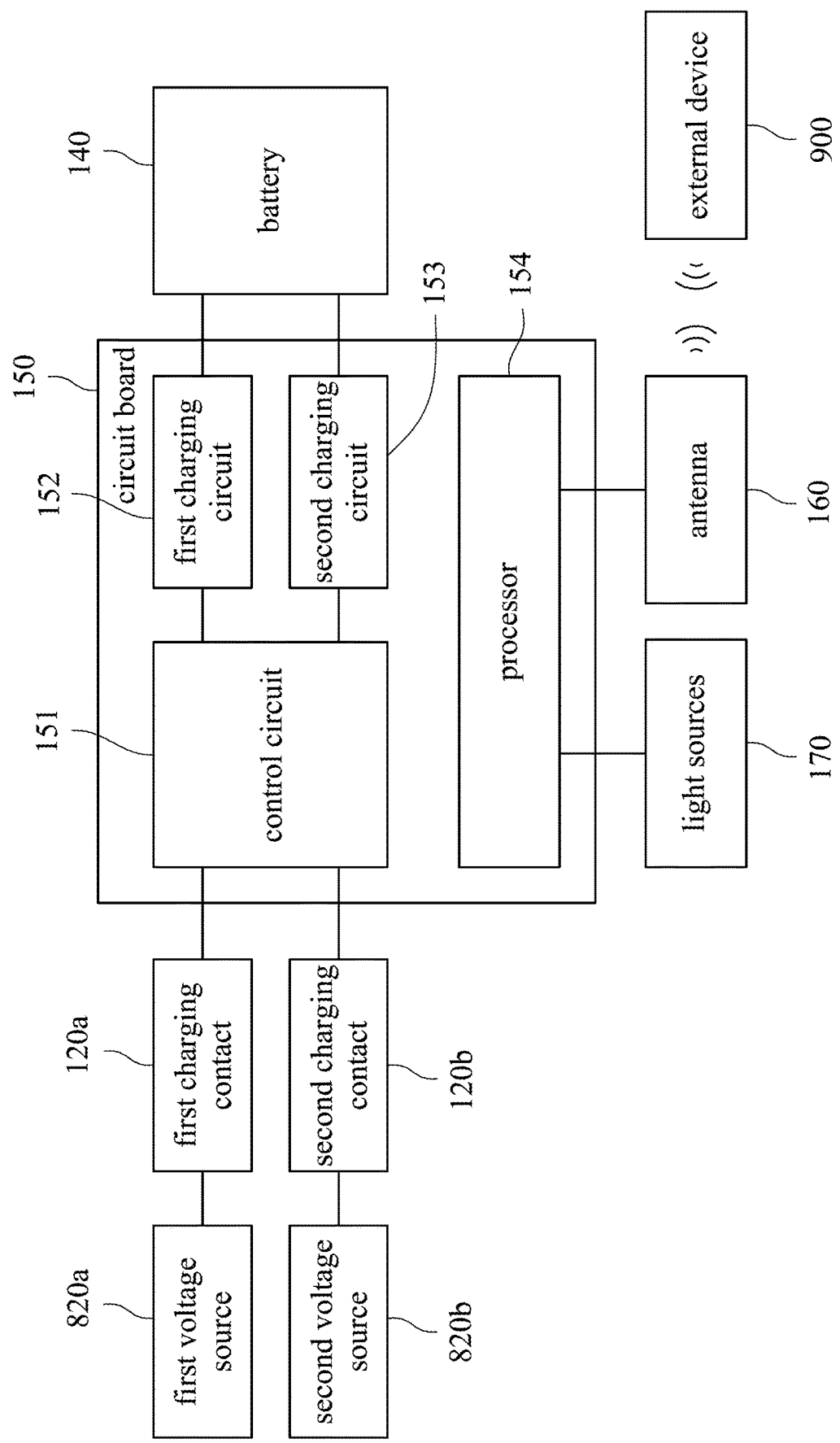
FIG. 3 illustrates a functional block diagram of internal components of the smart jewelry device shown in FIG. 2.

Please refer to FIG. 1 to FIG. 3. FIG. 1 illustrates a schematic top view of a smart jewelry device 100 charged in a charger 800 according to an embodiment of the present disclosure. FIG. 2 illustrates a schematic exploded view of the smart jewelry device 100 shown in FIG. 1. FIG. 3 illustrates a functional block diagram of internal components of the smart jewelry device 100 shown in FIG. 2. As shown in FIG. 1 and FIG. 2, the smart jewelry device 100 includes a metal housing 110, a first charging contact 120a, a second charging contact 120b, an insulating member 130, and a battery 140. As shown in FIG. 2, the metal housing 110 has a hollow portion S for receiving. In the embodiment shown in FIG. 1, the metal housing 110 is axisymmetric relative to an axis A, and is located at two endpoints of the metal housing 110. The first charging contact 120a and the second charging contact 120b are both axisymmetric relative to the axis A. In the embodiment shown in FIG. 1, the first charging contact 120a and the second charging contact 120b both are part of a spherical surface (known as a ball crown). The metal housing 110, the first charging contact 120a, and the second charging contact 120b collectively exhibit an axial and planar symmetric property. The insulating member 130 is disposed between the metal housing 110 and the first charging contact 120a (and also the second charging contact 120b), so as to electrically separate the metal housing 110 from the first charging contact 120a and the second charging contact 120b. As shown in FIG. 2, the battery 140 is disposed within the hollow portion S and is electrically connected to the first charging contact 120a and the second charging contact 120b (reference is made to FIG. 3).

As shown in FIG. 1 and FIG. 2, the metal housing 110 of the smart jewelry device 100 includes a first sub-housing 110a, a second sub housing 110b, and a third sub-housing 110c. The junction between the first sub-housing 110a and the second sub housing 110b is disposed with plural engaging hooks and engaging holes (not shown). The engaging hooks and the engaging holes are configured to engage with each other, such that the first sub-housing 110a may be fixed to the second sub housing 110b, and the second sub housing 110b may be fixed to the third sub-housing 110c, and the metal housing 110 is thus combined as a whole. In the embodiment shown in FIG. 1, the first sub-housing 110a, the second sub housing 110b, and the third sub-housing 110c are all axisymmetric relative to the axis A, but the present disclosure is not limited thereto.

As shown in FIG. 1, the charger 800 used for the smart jewelry device 100 includes an accommodating portion 810, a first voltage source 820a, and a second voltage source 820b. The accommodating portion 810 is conformed to at least one part of a shape of the smart jewelry device 100. In the present embodiment, the accommodating portion 810 is hemispherical, and thus a part of the smart jewelry device 100 can be accommodated within the accommodating portion 810. As shown in FIG. 1, when the smart jewelry device 100 is on charging, the first voltage source 820a is electrically connected to the first charging contact 120a, and the second voltage source 820b is electrically connected to the second charging contact 120b. In the present embodiment, when the smart jewelry device 100 is on charging, the charging would not be interrupted if the smart jewelry device 100 is rotated. Because the shape of the smart jewelry device 100 is plane symmetric relative to the plane P, the smart jewelry device 100 still fits well with the accommodating portion 810 of the charger 800 when the first charging contact 120a is connected to the second voltage source 820b and the second charging contact 120b is connected to the first voltage source 820a.

In some embodiments, the first charging contact 120a and the second charging contact 120b of the smart jewelry device 100 are both in shapes that are axisymmetric to the axis A, such as circular or ring-shaped. Such that, the first charging contact 120a and the second charging contact 120b are of no difference from the charger 800 when the smart jewelry device 100 is rotated along the axis A. In other words, if the smart jewelry device 100 is rotated along the axis A when being on charging, the charging would not be interrupted.

In some embodiments, the first charging contact 120a and second charging contact 120b of the smart jewelry device 100 is substantially plane symmetric relative to the plane P, but the first sub-housing 110a, the second sub housing 110b, and the third sub-housing 110c may be non-symmetric relative to the plane P. Although the exterior appearance may be different for the smart jewelry device 100 after rotation, there still exists no difference between the first charging contact 120a (or second charging contact 120b) and the charger 800. The embodiment of the present disclosure thus achieves a design of two-side charging, and the user does not need to flip over the smart jewelry device 100 for fitting the contact points of the charger 800.

The previous paragraphs mainly bases on FIG. 1 to describe the external structure of the smart jewelry device 100 and an operating method with the charger 800. The following paragraphs will describe the internal structure of the smart jewelry device 100 with reference to FIG. 2 and FIG. 3.

As shown in FIG. 2, the insulating member 130 of the smart jewelry device 100 is an insulating tube extending from one of the two endpoints of the metal housing 110 to the other of the two endpoints of the metal housing 110 through the hollow portion S. The insulating tube has an insulating space S' therein. In the embodiment shown in FIG. 1 to FIG. 3, the battery 140 is accommodated within the insulating space S' of the insulating member 130.

As shown in FIG. 2, the smart jewelry device 100 includes a circuit board 150. The circuit board 150 is located within the hollow portion S and outside the insulating space S'. Please refer to FIG. 3, the circuit board 150 is electrically connected to the battery 140, and is electrically connected to the first charging contact 120a and the second charging contact 120b. For example, the insulating member 130 may include multiple through holes, and the battery 140 and the circuit board 150 are electrically connected with each other through the through holes. As shown in FIG. 3, the circuit board 150 of the smart jewelry device 100 includes a control circuit 151, a first charging circuit 152, and a second charging circuit 153. The first charging circuit 152 and the second charging circuit 153 can modulate voltages provided by the first voltage source 820a and the second voltage source 820b so as to charge the battery 140. In some embodiments, the first voltage source provides a positive voltage, and the second voltage source provides a negative voltage. When the first charging contact 120a and the second charging contact 120b are electrically connected to the first voltage source 820a and the second voltage source 820b respectively, the control circuit 151 will determine that a voltage of the first charging contact 120a is higher than a voltage of the second charging contact 120b, and thus the control circuit 151 will activate the first charging circuit 152 to charge the battery 140. When the first charging contact 120a is electrically connected to the second voltage source 820b and the second charging contact 120b is connected to the first voltage source 820a, the control circuit 151 will determine that a voltage of the first charging contact 120a is lower than a voltage of the second charging contact 120b, and thus the control circuit 151 will activate the second charging circuit 153 to charge the battery 140. As such, the first charging contact 120a and the second charging contact 120b may be arbitrarily connected to the first voltage source 820a or the second voltage source 820b without needing to worry that the circuit board 150 might be broken down due to reverse charging.

As shown in FIG. 2, the smart jewelry device 100 also includes an antenna 160 and plural light sources 170. The antenna 160 is located within the hollow portion S and outside the insulating space S'. The light sources 170 are located on the second sub housing 110b. As shown in FIG. 3, the antenna 160 and the circuit board 150 are electrically connected with each other. In the embodiment shown in FIG. 1 to FIG. 3, a processor 154 is also disposed on the circuit board 150. The antenna 160 is electrically connected to the processor 154. For example, the antenna 160 receives signals from an external device 900 and transmits them to the processor 154, and then the processor 154 drives the light sources 170 to emit light according to the signals. For example, the processor 154 includes a blue tooth module used to control the antenna 160. The light sources 170 may be light emitted diodes (LED). The external device 900 may be a smart phone. For example, when the time is on the hour, the processor 154 will drive the light sources 170 to emit light to inform the user of the time information.

One embodiment of the smart jewelry device 100 is disclosed as aforementioned with reference to FIG. 1 to FIG. 3. It should be realized that people having ordinary skill in the art may make various modification without departing from the spirit and the scope of the present disclosure. Various modification of the smart jewelry device 100 is briefly exemplified as follows.

In some embodiments, the first sub-housing 110a, the second sub housing 110b, and the third sub-housing 110c have thread parts (not shown). In other words, the first sub-housing 110a, the second sub housing 110b, and the third sub-housing 110c are combined through thread meshing. In some embodiments, the first sub-housing 110a, the second sub housing 110b, and the third sub-housing 110c include magnetics, and are combined with each other by the magnetic force. The housings may be combined by any appropriate methods. The present disclosure is not limited thereto.

In some embodiments, the metal housing 110 may be spherical, oval, cylindrical, conical, funnel shaped, or be any other axisymmetric shape. The hollow portion S of the metal housing 110 may be spherical, oval, cylindrical, conical, funnel shaped, or be any other axisymmetric shape. The shape of the metal housing 110 and the shape of the hollow portion S may be same or different. The present disclosure is not limited thereto.

In some embodiments, the insulating member 130 includes two insulating rings, in which one of the insulating rings is disposed between the first charging contact 120a and the first sub-housing 110a, and the other of the insulating rings is disposed between the third sub-housing 110c and the second charging contact 120b. In some embodiments, the insulating member 130 not only includes two insulating rings, but also includes an insulating tube located within the hollow portion S of the metal housing 110 to provide an insulating space S' required by the smart jewelry device 100. In some embodiments, the insulating member 130 may be in a shape other than a tube (cylindrical), for example, the insulating member 130 may be spherical, so as to provide larger insulating space S'.

In some embodiments, the smart jewelry device 100 includes through holes. The through holes pass through the first charging contact 120a, the metal housing 110, and the second charging contact 120b along the axis A. Such that, the user may connect the smart jewelry device 100 to a bracelet, a necklace, or other ornament chains, and the smart jewelry device 100 can be rotated along the axis A.

In some embodiments, other than being located on the second sub housing 110b, the light sources 170 may be located on the first sub-housing 110a and the third sub-housing 110c. The light sources 170 may be configured to emit light with various colors and intensities. The arrangement of the light sources 170 may be arrange arbitrarily on the metal housing 110 to produce visual effects.

In some embodiments, other devices may be included in the smart jewelry device 100, for example, a sound device, a vibration device, or a radio device. In some embodiments, the processor 154 is electrically connected to the sound device and drives the sound device to produce sounds according to signals received by the antenna 160. In some embodiments, the processor 154 is electrically connected to the vibration device and drives the vibration device to vibrate according to signals received by the antenna 160. In some embodiments, the processor 154 is electrically connected to the radio device, in which the radio device may receive sounds produce by the user and transmit the sounds to the external device 900 by the antenna 160. The smart jewelry device 100 of the present disclosure may include devices with multiple functionalities, and thus not limited thereto.

In some embodiments, the charger 800 may be designed with various outlooks, for example, the charger 800 may be designed as a jewelry box, a makeup box, or so on. The accommodating portion 810 within the charger 800 has a shape conformed to a part of the shape of the smart jewelry device 100. The first voltage source 820a and the second voltage source 820b of the charger 800 are located at two ends of the accommodating portion 810 respectively.

In some embodiments, the charger 800 further includes a fixing mechanism (not shown), so as to fix the smart jewelry device 100 to the accommodating portion 810 after the smart jewelry device 100 is placed into the accommodating portion 810. In some embodiments, the fixing mechanism may be a flexible narrow part disposed at the opening of the accommodating portion 810. After the smart jewelry device 100 is forced to pass through the flexible narrow part into the accommodating portion 810, the smart jewelry device 100 will be fixed in the accommodating portion 810 by the flexible narrow part.

In some embodiments, the fixing mechanism may be springs disposed behind the first voltage source 820a and the second voltage source 820b. After the smart jewelry device 100 is plugged into the accommodating portion 810, the first voltage source 820a and the second voltage source 820b will be pushed backward and then elastic forces generated by the springs will hold the smart jewelry device 100 within the accommodating portion 810.

In some embodiments, the fixing mechanism may be magnetics, for example, a magnetic with its north pole distal to the smart jewelry device 100 is disposed at the first charging contact 120a, and a magnetic with its south pole facing towards a center of the accommodating portion 810 is disposed at the first voltage source 820a. As such, after the smart jewelry device 100 is placed into the accommodating portion 810, the first charging contact 120a and the first voltage source 820a will be attached to each other by the attractive force of the magnetics. Second charging contact 120b and second voltage source 820b operate as the same.

In some embodiments, the fixing mechanism may be a manual hold mechanism. That is, the charger 800 is disposed with elements which may be pushed or rotated by the user to move the first voltage source 820a and the second voltage source 820b towards or away from a center of the accommodating portion 810. As such, after the smart jewelry device 100 is placed into the accommodating portion 810, the user may determine whether to fix the smart jewelry device 100 in the accommodating portion 810 or release the smart jewelry device 100 from the accommodating portion 810 by pushing or rotating.

The smart jewelry device of the present disclosure includes axisymmetric and plane symmetric properties, in which the plane symmetric property may enable the smart jewelry device to be charged in two configurations, thus improving the convenience of the product; and when the smart jewelry device is being on charged, the axisymmetric property may prevent the smart jewelry device from being disconnected if being rotated, thus achieving the stability of charging. The insulating member within the smart jewelry device separates the charging contacts from other elements, and thus the housing of the smart jewelry device may be made of beautiful and durable metal materials. The smart jewelry device may be further disposed with various functional elements, thus as well achieving the functionality. In summary, the present disclosure provides a beautiful, functional, and user friendly smart jewelry device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A smart jewelry device, comprising:
   a metal housing having a hollow portion, and the metal housing is axisymmetric relative to an axis going through the metal housing, the metal housing comprises at least two sub-housings, each of the sub-housings has a thread portion, and the thread portions are meshed with each other;
   two charging contacts located on the axis and respectively located at two endpoints of the metal housing, each of the charging contacts has a flat first surface perpendicular to the axis and a second surface that forms part of a spherical surface;
   an insulating member disposed among the metal housing and the charging contacts, the insulating member extends from one of the endpoints to the other of the endpoints through the hollow portion; and
   a battery disposed within the hollow portion and an insulating space of the insulating member, and the battery is electrically connected to the charging contacts.

2. The smart jewelry device of claim 1, wherein each of the charging contacts is axisymmetric relative to the axis.

3. The smart jewelry device of claim 2, wherein each of the charging contacts is circular or ring-shaped.

4. The smart jewelry device of claim 1, further comprising a circuit board electrically connected to the battery, wherein the circuit board is electrically connected to the two charging contacts.

5. The smart jewelry device of claim 4, wherein the charging contacts comprise a first contact configured to be electrically connected to a first voltage source, and a second contact configured to be electrically connected to a second voltage source, the circuit board comprising:
   a first charging circuit;
   a second charging circuit; and
   a control circuit configured to activate the first charging circuit if a voltage provided by the first voltage source is greater than a voltage provided by the second voltage source, and the control circuit is configured to activate the second charging circuit if the voltage provided by the second voltage source is greater than the voltage provided by the first voltage source.

6. The smart jewelry device of claim 4, further comprising a wireless transmission device electrically connected to the circuit board.

7. The smart jewelry device of claim 1, wherein the metal housing comprises at least two sub-housings, the sub-housings respectively comprise a plurality of engaging holes and a plurality of engaging hooks respectively engaged with the engaging holes.

8. The smart jewelry device of claim 1, wherein the metal housing is spherical, oval, cylindrical, or conical.

9. The smart jewelry device of claim 1, wherein the hollow portion is spherical, oval, cylindrical, or conical.

10. A charger for the smart jewelry device of claim 1, the charger comprising:
    a main body having an accommodating portion, wherein a shape of the accommodating portion is conformed with at least one part of a shape of the smart jewelry device; and
    two voltage sources respectively disposed at two ends of the accommodating part to correspond to the charging contacts of the smart jewelry device.

* * * * *